(12) United States Patent
Tada et al.

(10) Patent No.: US 7,744,284 B2
(45) Date of Patent: Jun. 29, 2010

(54) BEARING HAVING CYLINDRICAL MEMBER CONNECTED TO OUTER MEMBER OF BEARING

(75) Inventors: Yoshiki Tada, Okazaki (JP); Michiyasu Nosaka, Anjo (JP); Takushi Kamiya, Nukata-gun (JP); Takayuki Suzuki, Hekinan (JP); Mitsuhiro Tanabe, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 509 days.

(21) Appl. No.: 11/798,962

(22) Filed: May 18, 2007

(65) Prior Publication Data

US 2008/0069487 A1 Mar. 20, 2008

(30) Foreign Application Priority Data

Sep. 15, 2006 (JP) ............................. 2006-251273

(51) Int. Cl.
F16C 43/04 (2006.01)
F16C 13/00 (2006.01)
(52) U.S. Cl. ..................................... 384/537; 384/547
(58) Field of Classification Search .................. 384/12, 384/537, 540, 546–547, 569
See application file for complete search history.

(56) References Cited

U.S. PATENT DOCUMENTS

| | | | | | |
|---|---|---|---|---|---|
| 2,779,641 | A | * | 1/1957 | Sutowski | 384/502 |
| 4,240,677 | A | * | 12/1980 | Payne et al. | 384/252 |
| 4,611,933 | A | * | 9/1986 | Hofmann et al. | 384/512 |
| 5,310,268 | A | * | 5/1994 | Schlereth | 384/537 |
| 5,375,933 | A | * | 12/1994 | Mizutani et al. | 384/476 |
| 5,961,222 | A | | 10/1999 | Yabe et al. | |
| 5,975,764 | A | * | 11/1999 | Okada et al. | 384/536 |
| 6,450,689 | B1 | * | 9/2002 | Takatsu | 384/449 |
| 6,513,986 | B2 | * | 2/2003 | Ito et al. | 384/569 |
| 6,645,415 | B2 | * | 11/2003 | Takatsu | 264/262 |

(Continued)

FOREIGN PATENT DOCUMENTS

EP 1 106 850 A1 6/2001

(Continued)

OTHER PUBLICATIONS

Office Action dated Mar. 26, 2009 issued from the German Patent Office for counterpart application No. 10 2007 043 627.2(English translation enclosed).

*Primary Examiner*—Marcus Charles
(74) *Attorney, Agent, or Firm*—Posz Law Group, PLC

(57) ABSTRACT

A bearing according to the present invention includes a cylindrical member formed on and around an outer member of a usual bearing. To firmly connect the cylindrical member to the outer member, grooves having an inclination relative to the axial direction of the bearing are formed so that the grooves do not cross one another on the outer surface of the outer member. The cylindrical member is made of a resin material by molding, and the resin, which is melted by heat in the molding process, enters into and adheres to the grooves. In this manner, the cylindrical member is firmly connected to the outer member so that movement in both of the rotational and axial directions of the bearing is prevented. The grooves formed on the outer surface of the outer member may be grouped, and their inclination relative to the axial direction may be alternately reversed group by group.

5 Claims, 4 Drawing Sheets

U.S. PATENT DOCUMENTS

| | | | |
|---|---|---|---|
| 2001/0014545 A1* | 8/2001 | Ito et al. | 439/17 |
| 2002/0047394 A1* | 4/2002 | Obara et al. | 310/90 |
| 2003/0059143 A1 | 3/2003 | Pairone et al. | |

FOREIGN PATENT DOCUMENTS

| | | | |
|---|---|---|---|
| FR | 1 123 876 | | 10/1956 |
| JP | 10159841 A | * | 6/1999 |
| JP | U-3063419 | | 8/1999 |
| JP | 11334369 A | * | 12/1999 |
| JP | 2004011730 A | * | 1/2004 |
| JP | 2004011799 A | * | 1/2004 |
| JP | 2005090521 A | * | 4/2005 |

* cited by examiner

US 7,744,284 B2

BEARING HAVING CYLINDRICAL MEMBER CONNECTED TO OUTER MEMBER OF BEARING

CROSS-REFERENCE TO RELATED APPLICATION

This application is based upon and claims benefit of priority of Japanese Patent Application No. 2006-251273 filed on Sep. 15, 2006, the content of which is incorporated herein by reference.

BACKGROUND OF THE INVENTION

The present invention relates to a bearing having a cylindrical member connected to an outer member of a bearing.

An example of a bearing having a cylindrical member connected to a bearing-outer (an outer ring of a bearing) is disclosed in JP-U-3063419. In this bearing, grooves are formed on an outer surface of the bearing-outer, and the cylindrical member made of resin is connected to the outer surface of the bearing-outer. A portion of the resin forming the cylindrical member adheres to the groove to thereby connect the cylindrical member to the bearing-outer of the bearing. In this manner, the cylindrical member and the bearing-outer is surely joined together to prevent relative rotation therebeteween.

In this bearing, the groove is formed in a spiral form, or the grooves are made to crossover each other. It is difficult to maintain a firm connection between the cylindrical member and the bearing-outer with a spiral groove when a high outside force is imposed on the bearing. Further, it is not easy to form the crossover spirals at a low manufacturing cost.

SUMMARY OF THE INVENTION

The present invention has been made in view of the above-mentioned problem, and an object of the present invention is to provide an improved bearing having a cylindrical member connected to an outer member of a bearing, in which the cylindrical member is firmly connected to the outer member in a simple manner.

The bearing according to the present invention includes a cylindrical member connected to an outer surface of a bearing. The cylindrical member is formed by molding a resin material or a power material directly on a bearing-outer or on an outer ring member connected to the bearing outer. Of these, the one on which the cylindrical member is formed is referred to as an outer member.

To firmly connect the cylindrical member to the outer member, grooves having an inclination relative to the axial direction of the bearing are formed on the outer surface of the outer member and do not cross one another. The material forming the cylindrical member, which is softened by heat in the molding process, enters into and adheres to the grooves to thereby firmly connect the cylindrical member to the outer member.

The outer surface of the outer member may be divided into several areas, and directions of the inclination of the grooves relative to the axial direction of the bearing may be alternately reversed area by area. Each groove may be formed in a V-shape or other curved shapes. Preferably, the inclination of the grooves relative to the axial direction is made 45° to obtain a sufficient connecting strength between the cylindrical member and the outer member in both the axial direction and the rotational direction of the bearing.

According to the present invention, the cylindrical member is firmly connected to the outer member by forming grooves on the outer surface of the outer member. Other objects and features of the present invention will become more readily apparent from a better understanding of the preferred embodiment described below with reference to the following drawings.

DETAILED DESCRIPTION OF THE PREFERRED EMBODIMENT

Figure 1:
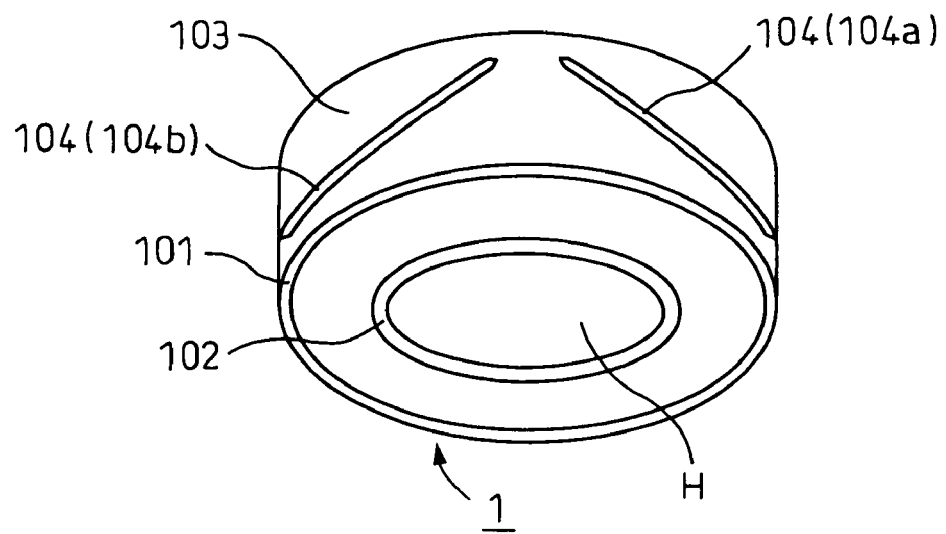
FIG. 1 is a perspective view showing a bearing, on which grooves are formed.

A preferred embodiment of the present invention will be described with reference to accompanying drawings. FIG. 1 shows a bearing composed of a bearing-inner 102, a bearing-outer 101, and rolling members disposed between the bearing-inner 102 and the bearing-outer 101. An inner ring of the bearing is referred to as "the bearing-inner", and an outer ring of the bearing is referred to as "the bearing-outer" in this specification. In a center of the bearing 1, a through-hole H is formed. On an outer surface 103 of the bearing-outer 101, grooves 104, a first groove 104a and a second groove 104b, are formed.

The grooves 104 are inclined relative to a center axis of the bearing 1. A direction of the inclination of the first groove 104a is different from that of the second groove 104b. The grooves 104 are formed to firmly connect a cylindrical member (explained later in detail) on the outer surface 103 of the bearing-outer 101. Though two grooves 104 are shown in FIG. 1, it is possible to form more grooves on the outer surface 103 of the bearing-outer 101.

Figure 2:
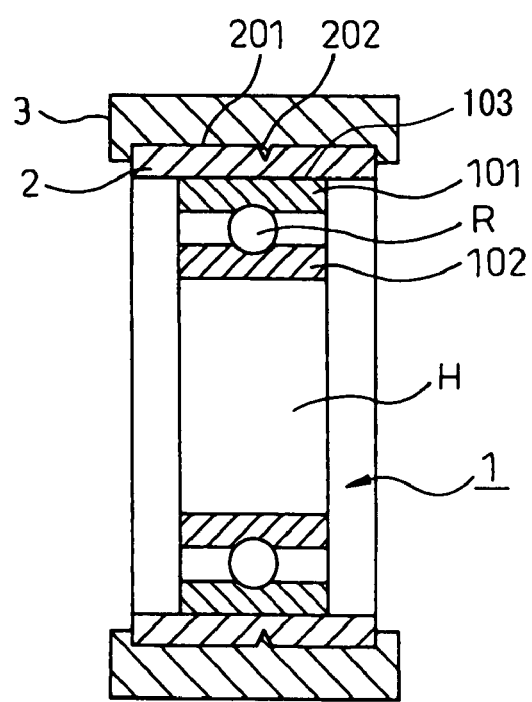
FIG. 2 is a cross-sectional view showing a bearing having a cylindrical member connected to an outer member of a bearing.
Figure 3:
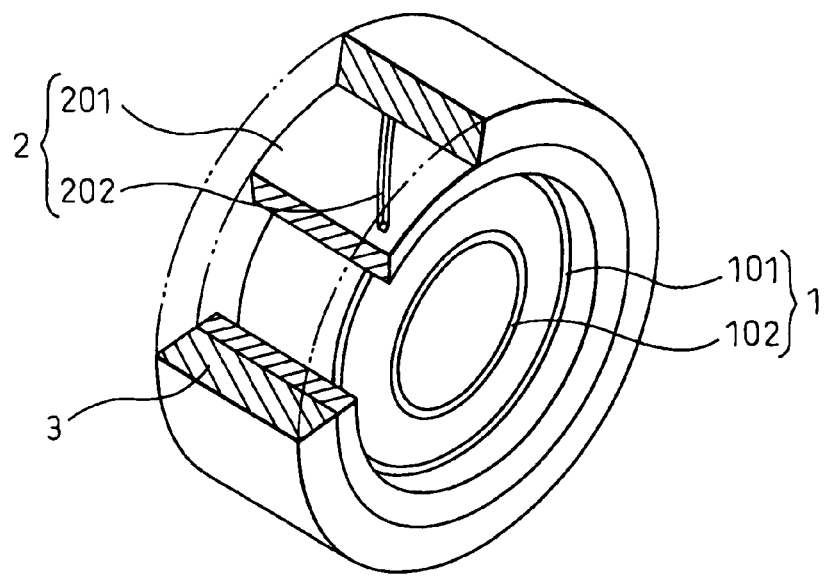
FIG. 3 is a perspective view, partially cross-sectioned, showing the same bearing shown in FIG. 2.

FIGS. 2 and 3 show another example of a bearing. In this example, an outer ring member 2 is connected to the outer surface of the bearing-outer 101. On an outer surface 201 of the outer ring member 2, grooves 202 are formed so that a cylindrical member 3 made of resin is firmly connected to the outer ring member 2. The shape of the grooves 202 is the same as the grooves 104 shown in FIG. 1. That is, the grooves are inclined relative to the center axis of the bearing 1, and two grooves incline in different directions. Two grooves 202 are formed such that the grooves 202 do not cross each other.

The grooves 104 formed on the bearing-outer 101 or the grooves 202 formed on the outer ring member 2 can be variously modified as explained below. Since the grooves are formed on the bearing-outer 101 or the outer ring member 2 in the same manner, the one of the bearing-outer 101 and the outer ring 2 on which the cylindrical member is formed is referred to as an "outer member" in the following description.

Figure 4:
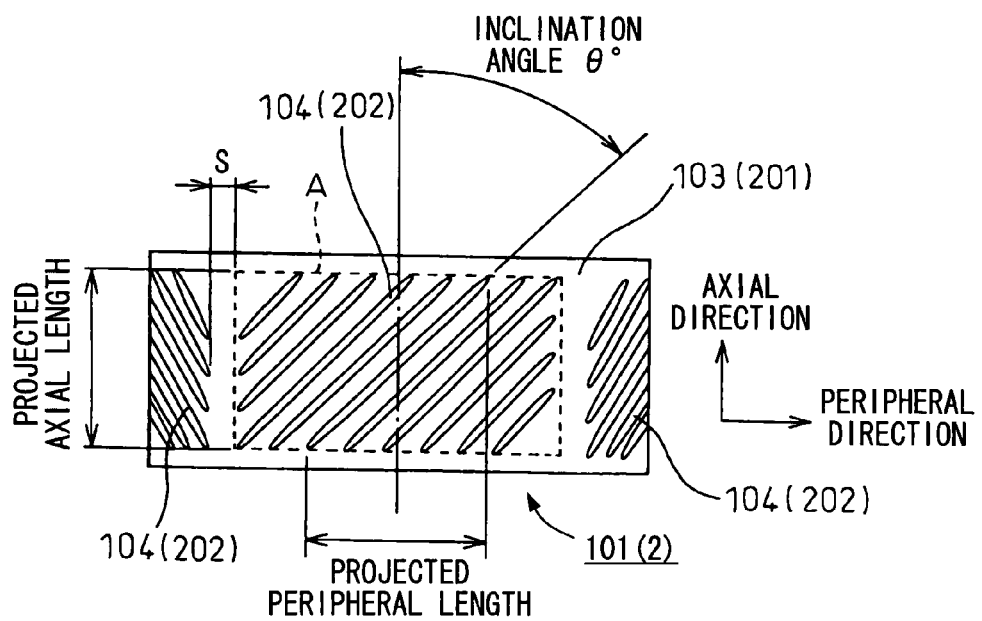
FIG. 4 is a side view showing an outer member of a bearing, on which grooves are formed.
Figure 7:
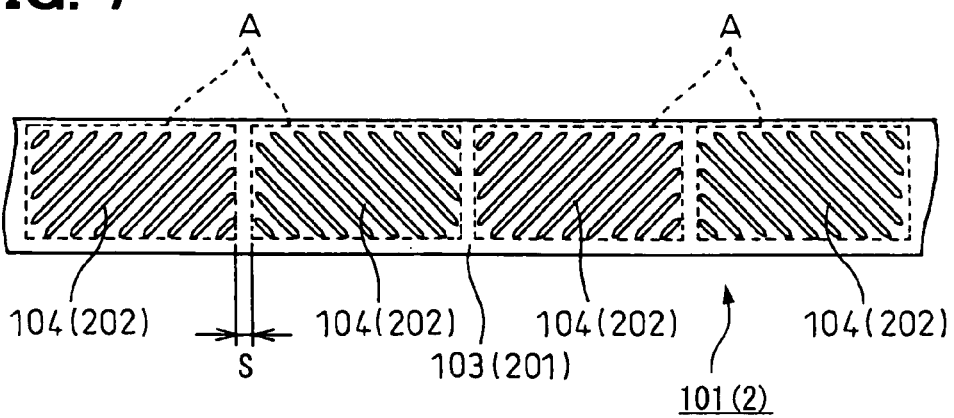
FIG. 7 is a drawing showing an outer surface of the outer member shown in FIG. 4, spreading in a plane.

The grooves (104, 202) on the outer member (101, 2) may be formed in a shape shown in FIG. 4. In this example, the outer surface (103, 201) of the outer member is divided into four areas A, each corresponding to a center angle of 90° of the bearing. A space S is formed between neighboring areas. In each area A, plural grooves (104, 202) are formed not to cross each other and to incline relative to the center axis of the bearing. The directions of the inclination are alternately reversed area by area. Though the inclination angle θ relative to the center axis can be arbitrarily selected, it is preferable to make it 45° for the reasons explained later. A depth of the grooves and an interval of the grooves can be variously selected. The side view of the outer member shown in FIG. 4 is shown in FIG. 7 in a spread form.

Figure 5:
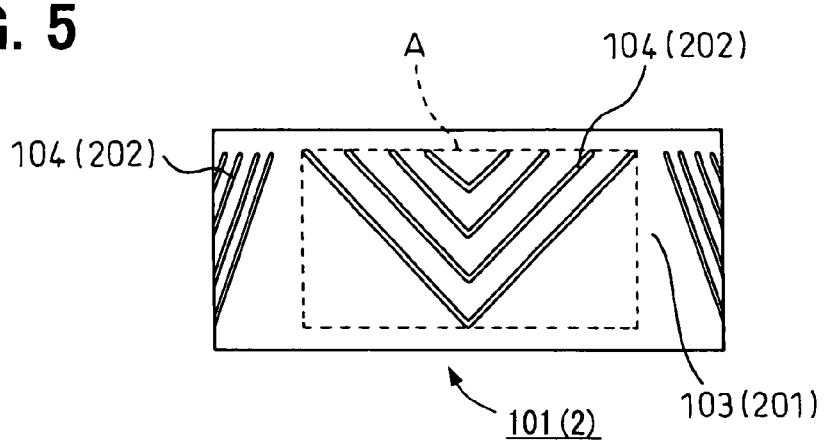
FIG. 5 is a side view showing an outer member of a bearing, on which V-shaped grooves are formed.
Figure 6:
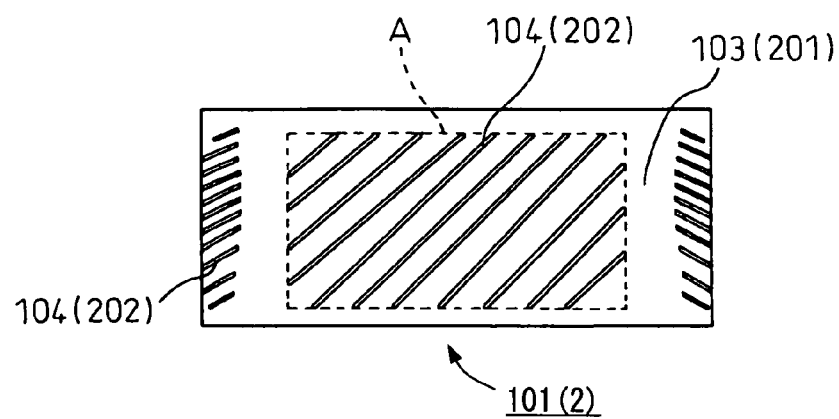
FIG. 6 is a side view showing an outer member of a bearing, on which grooves in another shape are formed.

As shown in FIG. 5, the grooves (104, 202) formed on the outer member (101, 2) may be made in a V-shape pattern. The patterns are reversed alternately area by area. The groove pattern is not limited to the V-shape pattern, but other patterns such as a sine-curve pattern may be employed. As shown in FIG. 6, the inclination directions of the grooves are not necessarily alternately reversed area by area. In the example shown in FIG. 6, the inclination direction is reversed in an area at the right side of a center area while it is not reversed in the left side area.

Figure 8:
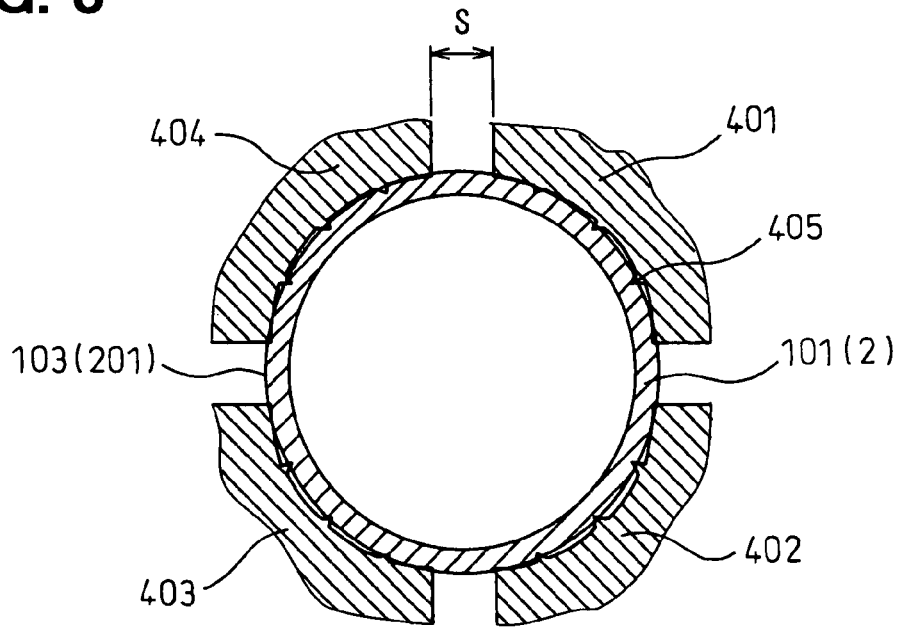
FIG. 8 is a cross-sectional view showing a press-die for forming grooves on an outer surface of an outer member of a bearing.

The grooves on the outer member (101, 2) can be formed in various methods. One example is shown in FIG. 8. In this example, the grooves are formed by press-work. Four press-dies 401-404, each having projected lines 405 corresponding to the grooves to be formed, are forcibly pressed against the outer surface (103, 201) of the outer member. In this manner, grooves in a desired shape can be formed. In this example, a space S is formed between neighboring areas.

The cylindrical member 3 is connected to the outer surface (103, 201) of the outer member (101, 2) in a known method such as molding. The cylindrical member may be formed with a resin material or a power material by molding. The material forming the cylindrical member 3 softened by heat in the molding process enters into the grooves (104, 202) to thereby firmly connect the cylindrical member 3 to the outer member.

Figure 9:
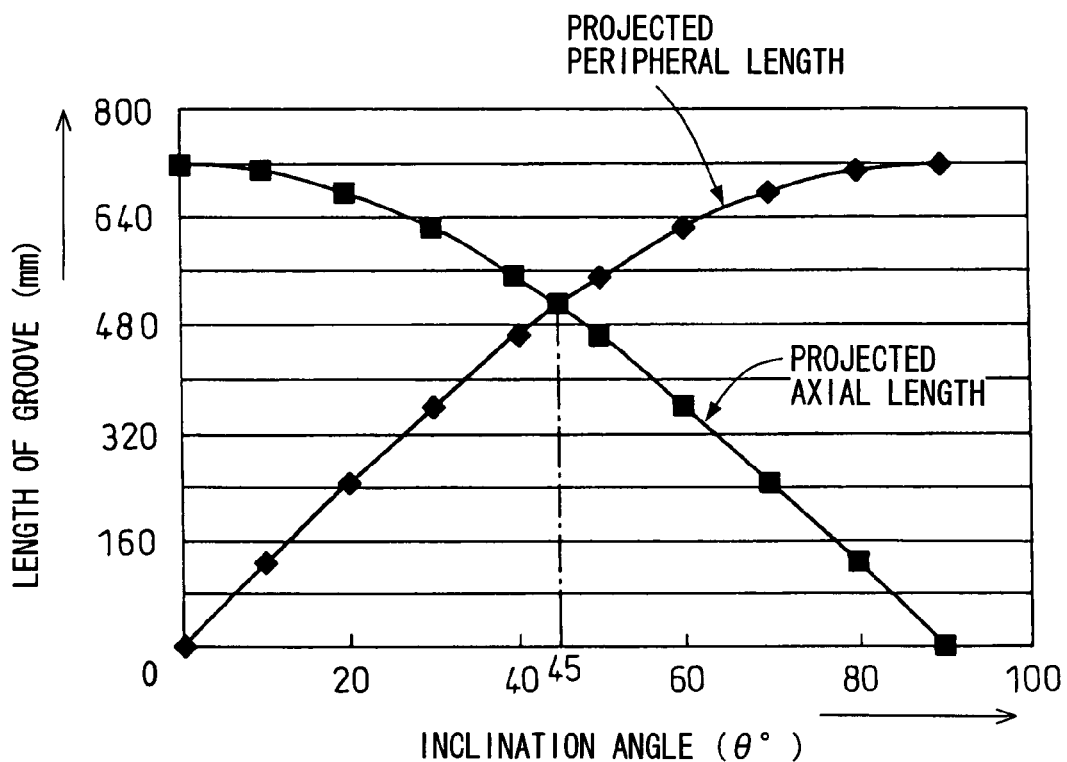
FIG. 9 is a graph showing a length of a groove projected on an axial line and on a peripheral line of a bearing relative to an inclination degree of the groove.

FIG. 9 shows a length of the groove (104, 202) projected on the axial line (a line parallel to the center axis of the bearing) and a length of the groove projected on a peripheral line (a line perpendicular to the center axis) relative to the inclination angle θ. The former is referred to as a projected axial length, and the latter is referred to as a projected peripheral length, both being shown in FIG. 4.

As seen in FIG. 9, the projected axial length becomes smaller as the inclination angle θ becomes larger, while the projected peripheral length becomes larger as the inclination angle θ becomes larger. The projected axial length contributes to increase in a force of preventing a relative rotation between the cylindrical member 3 and the outer member (101, 2). On the other hand, the projected peripheral length contributes to increase in a force of preventing a relative movement in the axial direction between the cylindrical member 3 and the outer member. When the inclination angle θ of the grooves is 45°, the relative movements in both directions are equally suppressed. Therefore, it is preferable to make the inclination angle θ 45°. The gripping force between the outer member and cylindrical member 3 in both of the rotational direction and the axial can be further increased by alternately reversing the inclination directions area by area.

The present invention is not limited to the embodiment or examples described above, but it may be variously modified. For example, the shape of the grooves is not limited to those shown above, but it may be formed in other shapes. The grooves may be formed by other methods than the press-work described above. The grooves may be formed by rolling. While the present invention has been shown and described with reference to the foregoing preferred embodiment, it will be apparent to those skilled in the art that changes in form and detail may be made therein without departing from the scope of the invention as defined in the appended claims.

What is claimed is:

1. A bearing comprising:
an outer member rotatably coupled to an inner ring of the bearing via rolling members;
a cylindrical member connected to the outer member; and
a plurality of grooves formed on the outer member for firmly connecting the cylindrical member to the outer member, wherein:
the plurality of grooves have inclinations relative to an axial direction of the bearing and are formed so that the grooves do not cross one another;
the plurality of grooves are grouped into several groups, and the grooves in each group have the same inclination relative to the axial direction of the bearing,
when viewed along a direction perpendicular to the axial direction of the bearing, each of the plurality of grooves is provided by a straight line inclined relative to the axial direction of the bearing,
the several groups are formed on an outer peripheral surface of the outer member and segmented by predetermined circumferential angles, respectively, and
the several groups are separated from each other by predetermined clearances.

2. The bearing as in claim 1, wherein the outer member is a bearing-outer of the bearing.

3. The bearing as in claim 1, wherein the outer member is an outer ring member, which is connected to the bearing-outer of the bearing.

4. The bearing as in claim 1, wherein a direction of the inclination relative to the axial direction of the bearing is alternately reversed group by group.

5. The bearing as in claim 1, wherein the inclination relative to the axial direction of the bearing is 45°.

* * * * *